United States Patent
Murphy et al.

(10) Patent No.: US 6,505,501 B1
(45) Date of Patent: Jan. 14, 2003

(54) APPARATUS AND METHOD FOR USE IN TESTING GAS PRESSURE REDUCTION EQUIPMENT

(75) Inventors: David Thomas Murphy, Newcastle-upon-Tyne (GB); Donald James Reid, Northumberland (GB); Ian Andrew Carscadden, Newcastle-upon-Tyne (GB)

(73) Assignee: BG plc, Reading (GB)

( * ) Notice: Subject to any disclaimer, the term of this patent is extended or adjusted under 35 U.S.C. 154(b) by 0 days.

(21) Appl. No.: 08/809,960

(22) PCT Filed: Jul. 31, 1996

(86) PCT No.: PCT/GB96/01851

§ 371 (c)(1),
(2), (4) Date: Feb. 8, 1999

(87) PCT Pub. No.: WO97/05417

PCT Pub. Date: Feb. 13, 1997

(30) Foreign Application Priority Data

Aug. 2, 1995 (GB) .............................. 95 15849

(51) Int. Cl.⁷ .............................................. G01M 3/02
(52) U.S. Cl. ........................................................ 73/37
(58) Field of Search ........................ 73/37, 40, 40.5 R, 73/46, 47, 49.1, 49.2, 49.3, 49.4, 49.5, 49.6, 49.7, 49.8, 168; 324/73.1; 417/63; 702/83, 138

(56) References Cited

U.S. PATENT DOCUMENTS

| | | | | |
|---|---|---|---|---|
| 3,511,082 A | * | 5/1970 | Lathrop et al. ................. | 73/46 |
| 3,593,567 A | * | 7/1971 | Hartley ............................ | 73/40 |
| 3,779,457 A | * | 12/1973 | Cornyn, Jr. et al. ..... | 235/151.3 |
| 4,096,737 A | * | 6/1978 | Schuh ............................ | 73/46 |
| 4,674,323 A | * | 6/1987 | Rulf et al. ................. | 73/61.1 C |
| 4,682,491 A | * | 7/1987 | Pickard .......................... | 73/37 |
| 4,766,765 A | * | 8/1988 | Ezekoye ........................ | 73/168 |
| 4,896,101 A | * | 1/1990 | Cobb ........................... | 324/73.1 |
| 5,272,647 A | * | 12/1993 | Hayes .................... | 364/551.01 |
| 5,339,678 A | * | 8/1994 | Haselmaier, Sr. ............. | 73/49.8 |
| 5,365,772 A | * | 11/1994 | Ueda et al. ................... | 73/40.7 |
| 5,425,270 A | * | 6/1995 | McDonald et al. ........... | 73/168 |
| 5,621,164 A | * | 4/1997 | Woodbury et al. ........ | 73/40.5 R |
| 5,677,500 A | * | 10/1997 | Ackerley et al. ........... | 73/865.9 |
| 5,748,469 A | * | 5/1998 | Pyotsia ........................ | 364/150 |
| 5,898,105 A | * | 4/1999 | Owens ........................ | 73/49.8 |
| 6,003,540 A | * | 12/1999 | Bruni et al. ................. | 137/312 |

FOREIGN PATENT DOCUMENTS

| GB | 2 062 812 | * 10/1979 |
|---|---|---|
| GB | 2 303 902 | * 3/1997 |

* cited by examiner

Primary Examiner—Hezron Williams
Assistant Examiner—Charles D. Garber
(74) Attorney, Agent, or Firm—William H. Holt (57) ABSTRACT

A portable diagnostic system for testing gas pressure reduction equipment includes a computer arrangement 16 interfaced to an electro-pneumatic test unit 12 which provides test pressures for and receives information on displacement from the pressure reduction equipment. Unit 12 includes a number of valves including three solenoid on/off valves, a needle valve and an on/off ball valve. The position of the valve member of the needle valve is sensed by a position transducer. Displacement transducers 40 and 42 connected to the reduction equipment sense slamshut valve and regulator displacements pressure transducer 44 and a differential pressure transducer 102 are each connected to the equipment. Signals from the transducers are fed to a data acquisition system 210 which also drives the solenoid valves and the needle and ball valves, all under the control of the PC 16 to give an indication for example of how far the valves are open in the regulating equipment (ie from the valve seat).

21 Claims, 11 Drawing Sheets

|  | RESULTS | LIMITS |  |
|---|---|---|---|
| SLAMSHUT VALVE TRAVEL | 31.9mm | > 28.0 | PASS |
| TIME FOR S/S V/V TRAVEL | 0.2sec | < 1.0 | PASS |
| S/S TRIP PRESSURE START | 108.1mbar | <220.0 | PASS |
| S/S TRIP PRESSURE END | 109.3mbar | | |
| FINAL PRESSURE | 127.9mbar | | |

SLAMSHUT ACTUATOR RESPONSE & LEAKAGE

| SLAMSHUT TRIP | RESULTS | LIMITS | |
|---|---|---|---|
| SLAMSHUT VALVE TRAVEL | 31.9mm | > 28.0 | PASS |
| TIME FOR S/S V/V TRAVEL | 0.2sec | < 1.0 | PASS |
| S/S TRIP PRESSURE START | 125.4mbar | | |
| S/S TRIP PRESSURE END | 131.7mbar | | |
| MAX. TEST PRESSURE | 236.5mbar | | |

| SLAMSHUT LEAKAGE | RESULTS | LIMITS | |
|---|---|---|---|
| INITIAL PRESSURE | 202.4mbar | | |
| FINAL PRESSURE | 201.9mbar | | |
| PRESSURE DIFFERENCE | 0.6mbar | < 2.0 | PASS |

APPARATUS AND METHOD FOR USE IN TESTING GAS PRESSURE REDUCTION EQUIPMENT

BACKGROUND OF THE INVENTION

The invention relates to apparatus and methods for use in testing gas pressure reduction equipment.

Such equipment is usually mounted on so-called skid units or is more compact and in the form of control modules, which commonly are installed in a pit below the surface of the ground. Such equipment is hereinafter called "pr equipment".

SUMMARY OF THE INVENTION

The apparatus is intended to form part-of computer-aided diagnostic test equipment by which diagnostic testing of skid units and gas control modules can be performed. In particular it is intended to form a portable diagnostic system for testing pr equipment in situ. Such testing is required to perform static and dynamic tests on the various regulator valves, and safety devices such as relief valves, slamshut and stream selection valves and so on incorporated in skid units or control modules without the need for any disassembly and to obtain accurate pressure set points. The testing also allows identification of changes in performance owing to gradual wear and tear by comparison of results with those obtained on a previous occasion.

According to the invention there is provided a portable diagnostic system for testing pressure reduction equipment in situ, said system including;

means for connecting at least one displacement transducer to the reduction equipment;

means for detecting a fluid pressure;

control means for selecting an output fluid pressure for testing the reduction equipment;

means for receiving valve displacement information from at least one transducer in dependence on selected and/or detected pressure to determine the degree of movement of the valve relative thereto.

After the initial data gathering process has been completed it is possible for the operator to interrogate the computer preferably forming part of the system to identify which component may be at fault when the results criteria are not met.

A high standard of maintenance records will be achieved by the simple process of downloading and storing test results on the office computing system.

The computer includes a display and enables a knowledge-based expert system to be employed. The apparatus enables a very complex set of tests to be carried out relatively easily. A program disc used in the computer enables all instructions and prompts to be displayed on the computer display screen.

The apparatus supplies gas to various points on the equipment to be tested and gas flowrate and gas pressure are measured and this information is made available to the computer. Displacement transducers and gas pressure transducers are mounted on the pr equipment and the information derived by the transducers is made available to the computer. The duties of the computer include the calculation of the rates of rise and fall of pressure of the gas fed to the pr equipment as well as the calculation of the rates of rise and fall of pressure of the gas at the various components of the equipment. The computer's duties also include the calculation of the rates of opening and closing movement of the various components of the pr equipment.

The apparatus controls the supply of gas to the pr equipment by means of an array of valves, including a valve which passes gas at all positions of the valve member beyond the closed position and the computer's duties include the generation of signals controlling the actuator of that valve, as well as the actuators of the on/off valves.

The apparatus is used as computer-aided diagnostic test equipment to perform any combination of a number of tests which the software used in the computer has been written to perform. The apparatus enables such combinations of tests to be readily performed.

Further, according to the invention apparatus having a gas inlet and a gas port for use in testing gas pressure reduction equipment comprises:

first, second and third valves, the first and second valve having a respective inlet and outlet, the third valve having first and second valve ports, the inlet of the first valve communicating with said gas inlet, the outlet of the first valve communicating with both the inlet of the second valve and the first valve port of the third valve, the outlet of the second valve communicating with the atmosphere, the second valve port of the third valve communicating with said gas port, the third valve having a valve member and means for moving the valve member to a fully closed position and to a fully open position and to intermediate positions therebetween.

Said third valve is preferably associated with a position transducer which can produce an electrical output indicative of the position of said third valve member.

Said apparatus preferably has a fourth valve having an inlet and an outlet, the inlet of the fourth valve communicating with the gas inlet and the outlet of the fourth valve communicating with said gas port.

Said apparatus preferably has a fifth valve having an inlet and an outlet, the inlet of the fifth valve communicating with said gas port and the outlet of the fifth valve communicating with the atmosphere.

Further, according to the invention a method of testing gas pressure reduction equipment using apparatus according to the invention comprises comparing the results obtained with results obtained on a previous occasion of carrying out the method in order to identify changes in performance of the equipment.

The method may comprise interrogation of said computer to identify which component of the equipment may be at fault when the results show that a predetermined standard is not met.

The method may comprise downloading and storing test results on a computing system in order to generate maintenance records.

The method may comprise controlling by means of software used in said computer the rate of pressure rise and the rate of pressure fall in the gas applied to a component of the equipment.

An embodiment of apparatus for use in testing gas pressure reduction equipment will now be described by way of example with reference to the accompanying drawings, in which:

DETAILED DESCRIPTION OF THE INVENTION

Figure 1:
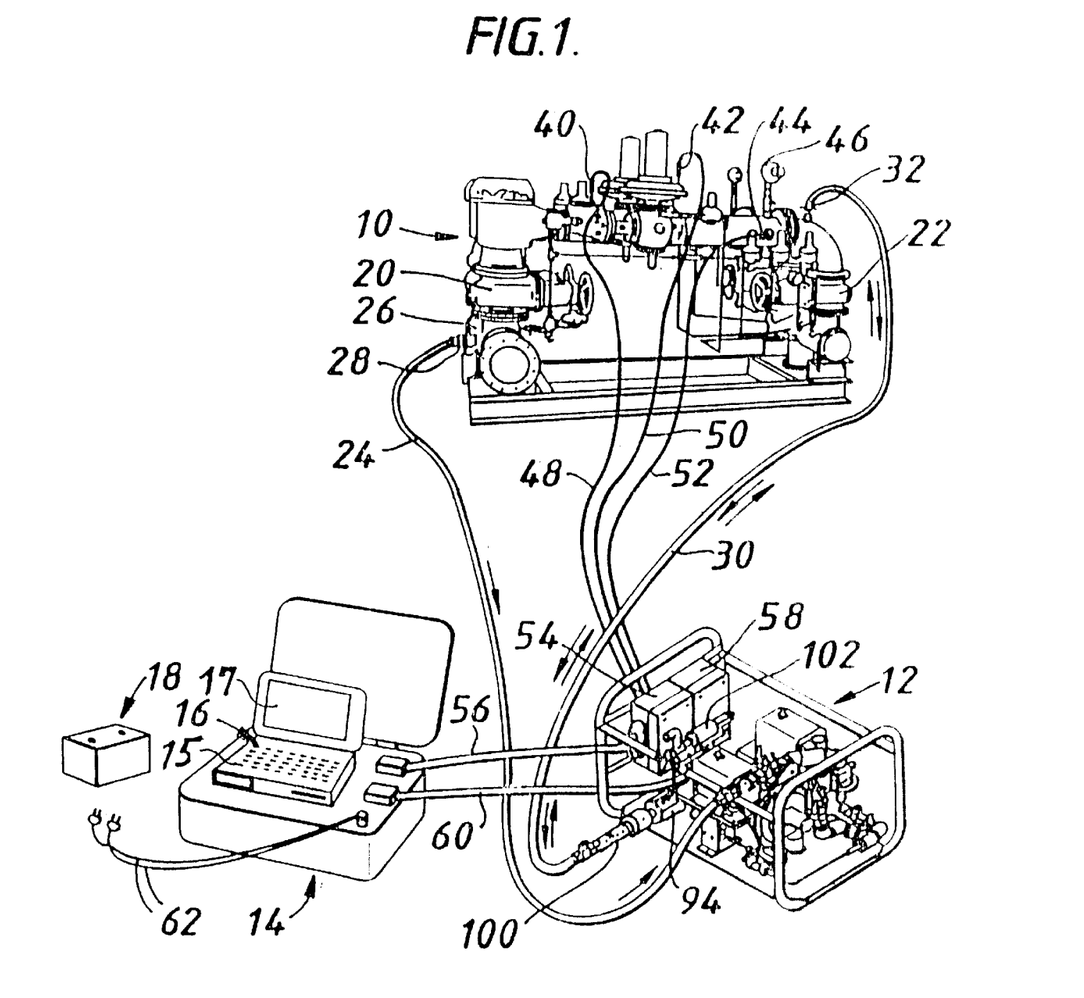
FIG. 1 is a schematic view of the diagnostics system including the computer configuration and the electro-pneumatic test unit which is connected to pr equipment in the form of a skid unit in the example.

FIG. 1 shows: pr equipment 10 in the form of a skid unit and to be subjected to testing. An electro-pneumatic test unit 12 is connected to it and an interface unit 14 contained in a case is connected to a portable personal computer 16 having a keyboard 15 and associated display screen 17. A 12-volt battery power supply 18 is shown available to power the system. The computer is of the type that includes a microprocessor, RAM, ROM, hard disc storage and serial and parallel ports. A floppy disc drive is also provided.

The inlet valve 20 and the outlet valve 22 are both closed. The unit 12 is connected by a hose 24 to the high pressure gas main 26 via an on-off valve 28. The unit 12 is connected by a second hose 30 to an on-off valve 32 which is connected to a point in the pr equipment immediately upstream of the outlet valve 22.

It should be noted that gas can both be supplied to the pr equipment and conveyed away from the pr equipment via the hose 30.

Displacement transducers 40,42 are mounted on the pr equipment. For example, the transducer 40 gives an electrical analogue signal representing the movement of a slamshut valve member and the transducer 42 gives an electrical analogue signal representing the movement of a regulator valve member.

Figure 4:
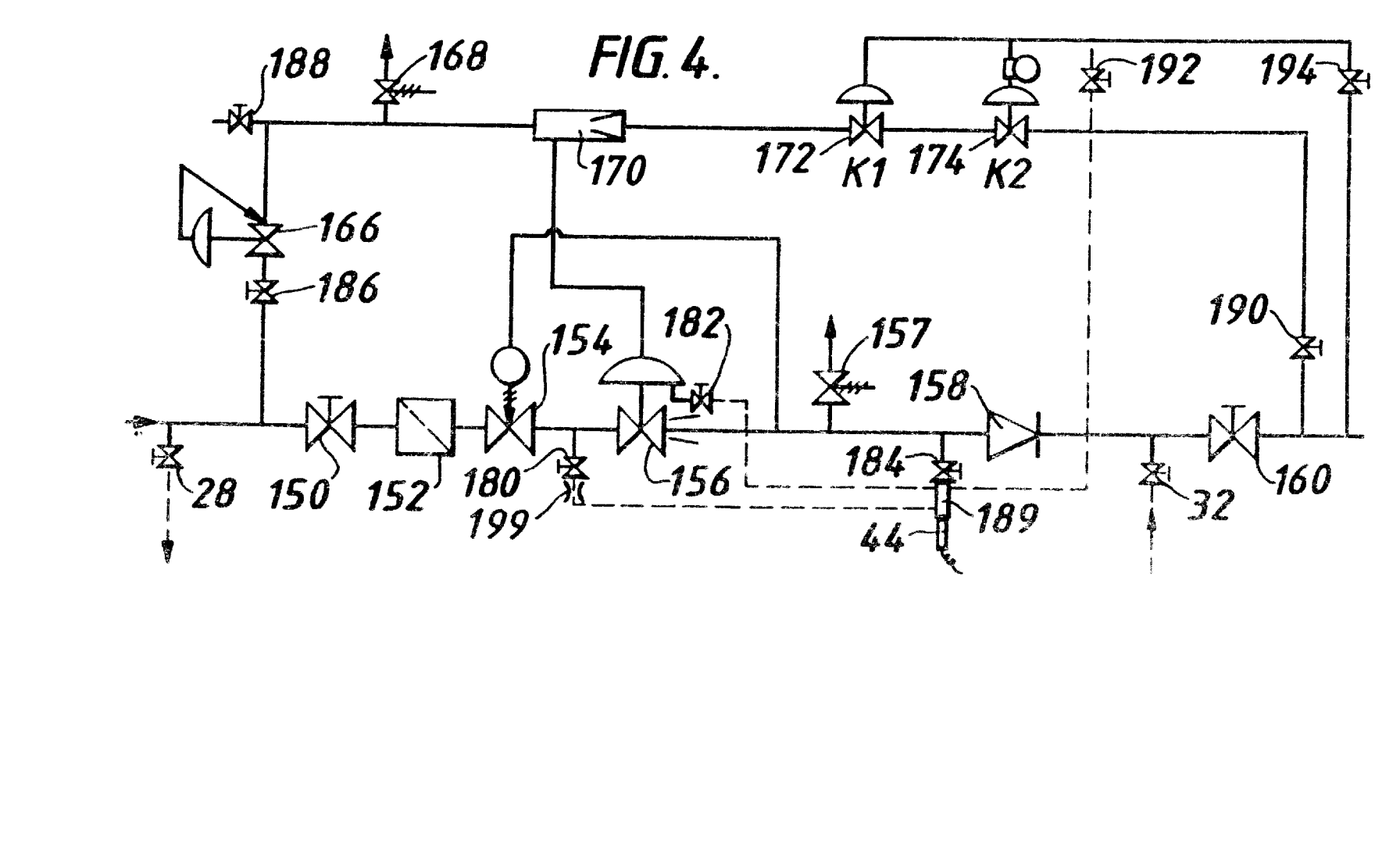
FIG. 4 is a diagram showing the pr equipment and connections (shown by broken lines) to the test and diagnostics apparatus.

A pressure transducer 44 is connected to a pressure manifold (see FIG. 4) which is connected to an on-off valve (see FIG. 4) connected to a point in the pr equipment immediately downstream of a relief valve 46 (see FIG. 4).

The transducers 40,42 and 44 are connected by cables 48,50,52, respectively, to a junction box 54 on the unit 12. The box 54 is connected to the interface 14 by a cable 56.

The apparatus included in the unit 12 comprises valves (see FIG. 5) operated by actuators (not shown) controlled by the computer 16. The interface 14 is connected to junction box 58 by a cable 60.

The interface 14 is connected to the battery power supply 18 by cables 62 and the computer 16 is connected by cables (not shown) to the interface 14.

Figure 2:
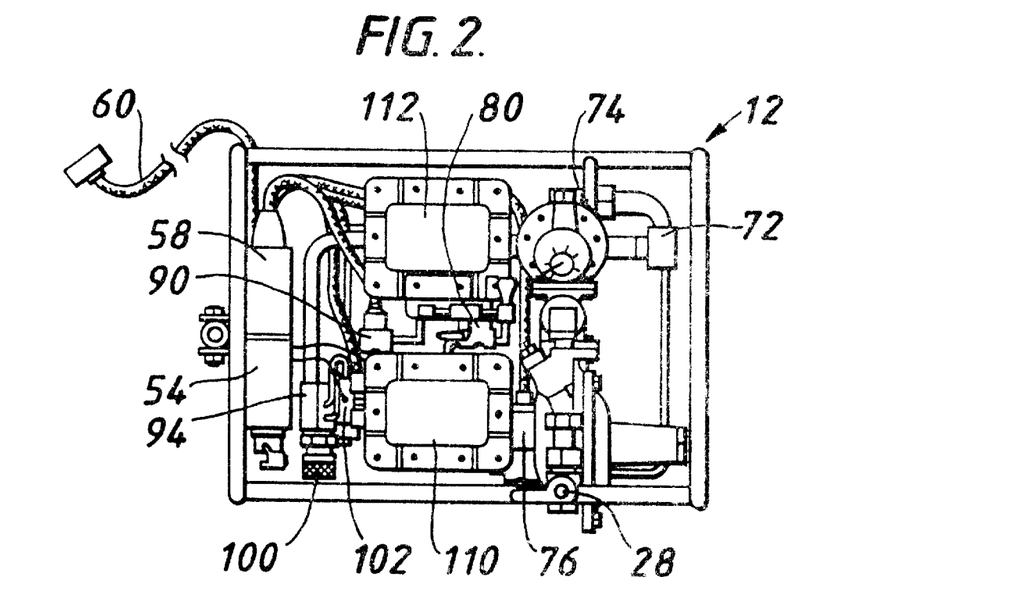
FIGS. 2 & 3 are plan views of the electro-pneumatic test apparatus, each with parts removed, showing, respectively, pipe circuit-connections and electric cable connections.
Figure 3:
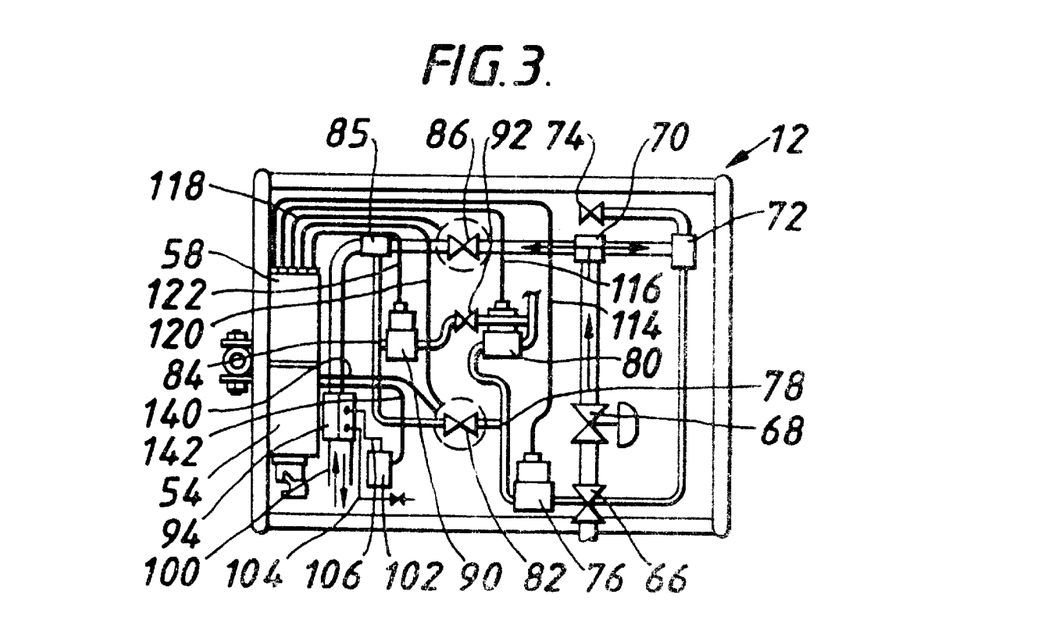

FIGS. 2 and 3 show more detail of the unit 12. Gas reaches the unit 12 via the hose 24 (FIG. 1) and enters the unit through an on-off valve 66 (FIG. 3). With further reference to FIG. 3, the gas then enters a pressure regulator 68 and flows to a tee-junction 70. One branch leads to a second tee-junction 72 and thence to an on-off valve 74 (communicating with the atmosphere) and the other branch leads to the inlet of a first solenoid valve 76. The outlet of the valve 76 is connected to a tee-junction 78. One outlet of the junction 78 is connected to the inlet of a second solenoid valve 80, the outlet of which communicates with atmosphere.

The other outlet of the junction 78 is connected to first valve port of a third valve in the form of a needle valve 82. The second valve port of the needle valve 82 is connected to a tee-junction 84.

It is not possible to refer to an "inlet" or an "outlet" of the needle valve 82 because gas can flow in either direction through the needle valve 82.

One port of the tee-junction 84 is connected to a tee-junction 85, one outlet of which is connected to the outlet of a fourth valve in the form of a ball valve 86. The inlet of the ball-valve 86 is connected to the second outlet of the tee-junction 70.

The second outlet of the tee-junction 84 is connected to the inlet of the fifth valve in the form of a solenoid valve 90. The outlet of the valve 90 is connected to the inlet of an on-off valve 92, the outlet of which is connected to atmosphere.

The second port of the tee-junction 85 is connected to an orifice plate 94. The orifice plate 94 is connected to the gas port 100 which is connected to the gas hose 30 (FIG. 1).

A differential pressure transducer 102 is connected by tubes 104,106 to opposite sides of the orifice plate 94.

FIG. 2 shows an actuator 110 for the needle vale 82 and an actuator 112 for the ball valve 86. It also shows cables 114,116,118,120,122 which convey the control signals from the junction box 58 to the solenoid valve 76, the solenoid valve 80, the ball valve 86, the needle valve 82 and the solenoid valve 84, respectively. The junction box 58 is connected to the interface 14 by the cable 60.

FIG. 3 also shows a cable 140 which interconnects the valve 82 and the junction box 54. This conveys the electrical signal from a position transducer (not shown) which is incorporated in the actuator 110 representing the position of the valve member (the needle) of the valve 82.

FIG. 3 also shows a cable 142 which interconnects the differential pressure transducer 102 and the junction box 54 and which conveys the electrical signal representing the differential pressure measured across the orifice plate 94. The computer calculates the rate of gas flow through the orifice plate 94 from this signal.

FIG. 4 shows part of the pr equipment, in the form of a skid unit. The pr equipment comprises a main stream (shown) and a standby stream (not shown in FIG. 4 but shown generally in the background of FIG. 1). It will be understood that the diagnostic system can be connected to first one stream (as shown) and then to the other stream as required.

For example, the main stream comprises: an inlet valve 150; a filter 152; a slamshut valve 154; a regulator 156; a relief valve 157; a wafercheck valve 158; and an outlet valve 160. In parallel with the main stream there is an auxiliary rail comprising: a "J" Governor 166; a "J" relief valve 168; an inspirator 170; a K1 pilot valve 172; and a K2 pilot valve 174.

Manually operable on-off valves are provided as follows: the valve 28 upstream of the valve 150 and to which the hose 24 is connected (FIG. 1); the valve 180 intermediate the slamshut valve 154 and the regulator 156; the valve 182 through which impulse pressure can directly act on the underside of the diaphragm of the regulator 156 is communicated; the valve 184 between the relief valve 157 and the wafercheck valve 158 and to which the pressure manifold 189 is connected. The pressure manifold was mentioned in connection with the description of FIG. 1. The pressure transducer 44 is connected to the pressure manifold 189; and the valve 32 already mentioned (see FIG. 1).

In addition, the following manual on-off valves are provided on the auxiliary rail as follows: the valve 186 intermediate the main stream and the "J" Governor; the valve 188 intermediate the "J" Governor and the "J" relief valve; and the valve 190 immediately upstream of the connection between the auxiliary rail and the main stream.

Finally, a manually operable valve 192 is provided which is connected to sense the pressure below the diaphragms of the pilot valves 172 and 174 and a manually operable valve 194 through which the pressure downstream of the stream outlet valve 160 can act below the diaphragms of the pilot valves 172 and 174.

FIG. 4 also shows a restrictor 199 intermediate the pressure manifold 189 and the manually operable valve 180 to restrict the flow of gas while venting the pressure upstream of the regulator 156.

Figure 5:
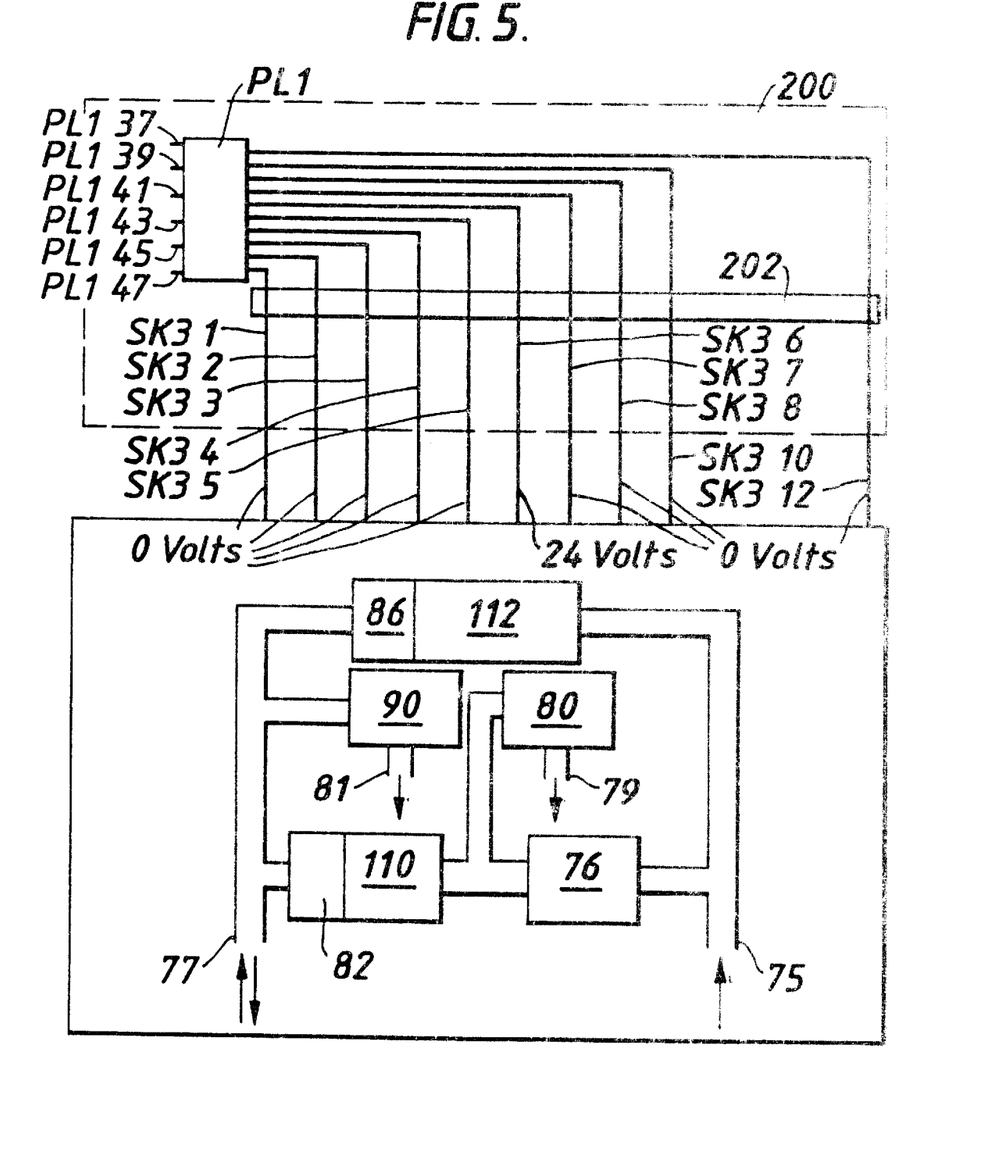
FIG. 5 is a diagram showing the apparatus in simplified form with a relay driver board used to control operation of the apparatus.

FIG. 5 shows the apparatus incorporated in the unit 12 and described with reference to FIG. 3. FIG. 5 is a simplified drawing but shows the valves 76, 80, 82, 86 and 90 which form one embodiment of the present invention. The regulator 68 and the tee-junction 72 and the on-off valve have been omitted from FIG. 5, as well as the orifice plate 94.

At its broadest, one aspect of the invention comprises only the valves 76, 80 and 82 arranged as shown in FIG. 5 the valves 86 and 90 being omitted. However, FIG. 5 in its entirety shows-the preferred form of that aspect of the invention. In FIG. 5 the inlet port is marked 75 and the gas port is marked 77. The solenoid valve 80 has an outlet communicating at 79 with the atmosphere and the solenoid valve 90 has an outlet communicating at 81 with the atmosphere.

The solenoid valves 76,80 and 90 and the ball valve 86 all handle flow of gas in one direction only. However, the needle valve 82 handles flow in either direction. The solenoid valve 76 may be termed a feed valve; the solenoid valve 80 may be termed a slow vent valve, although the rate of venting is dictated by the setting of the needle in the needle valve; and the solenoid valve 90 may be termed a fast vent valve.

Figure 6A:
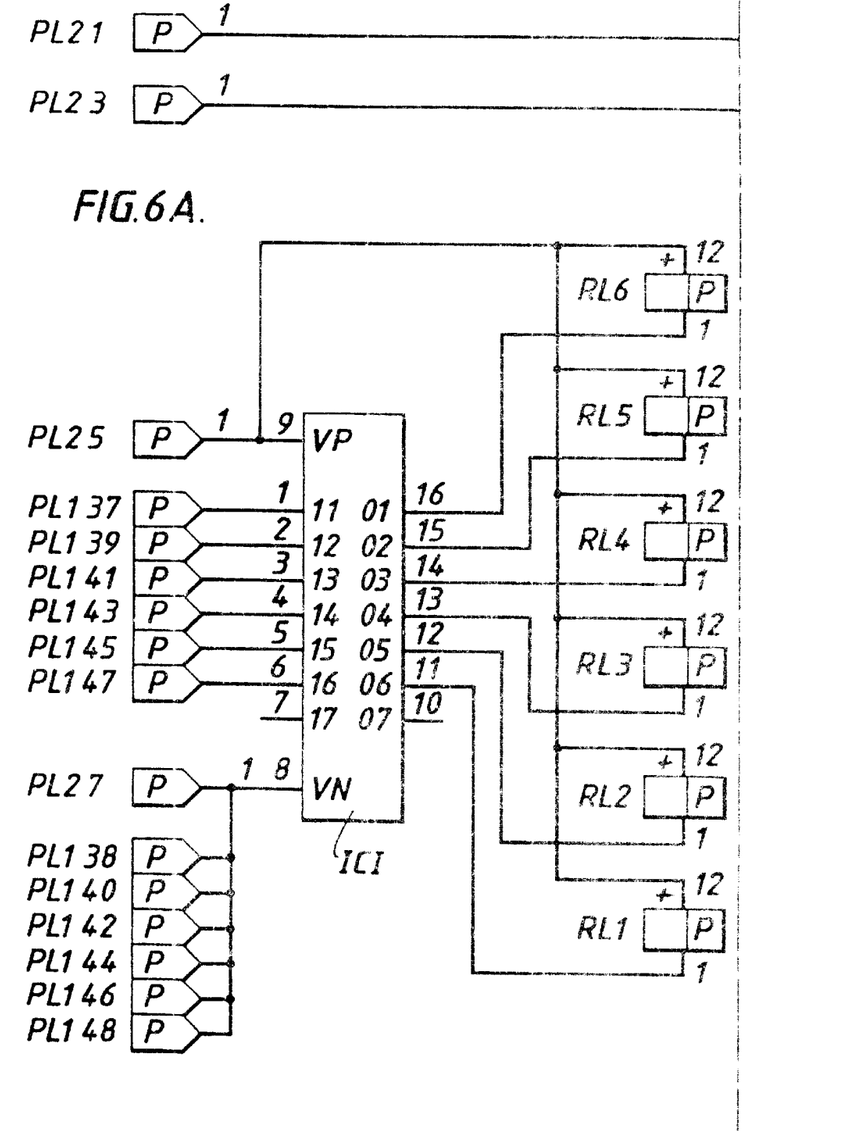
FIGS. 6A & 6B show a diagram of part of the electrical circuit contained in the interface 14 showing details of the relay driver board used to control the actuators of the valves shown in FIG. 5.
Figure 6B:
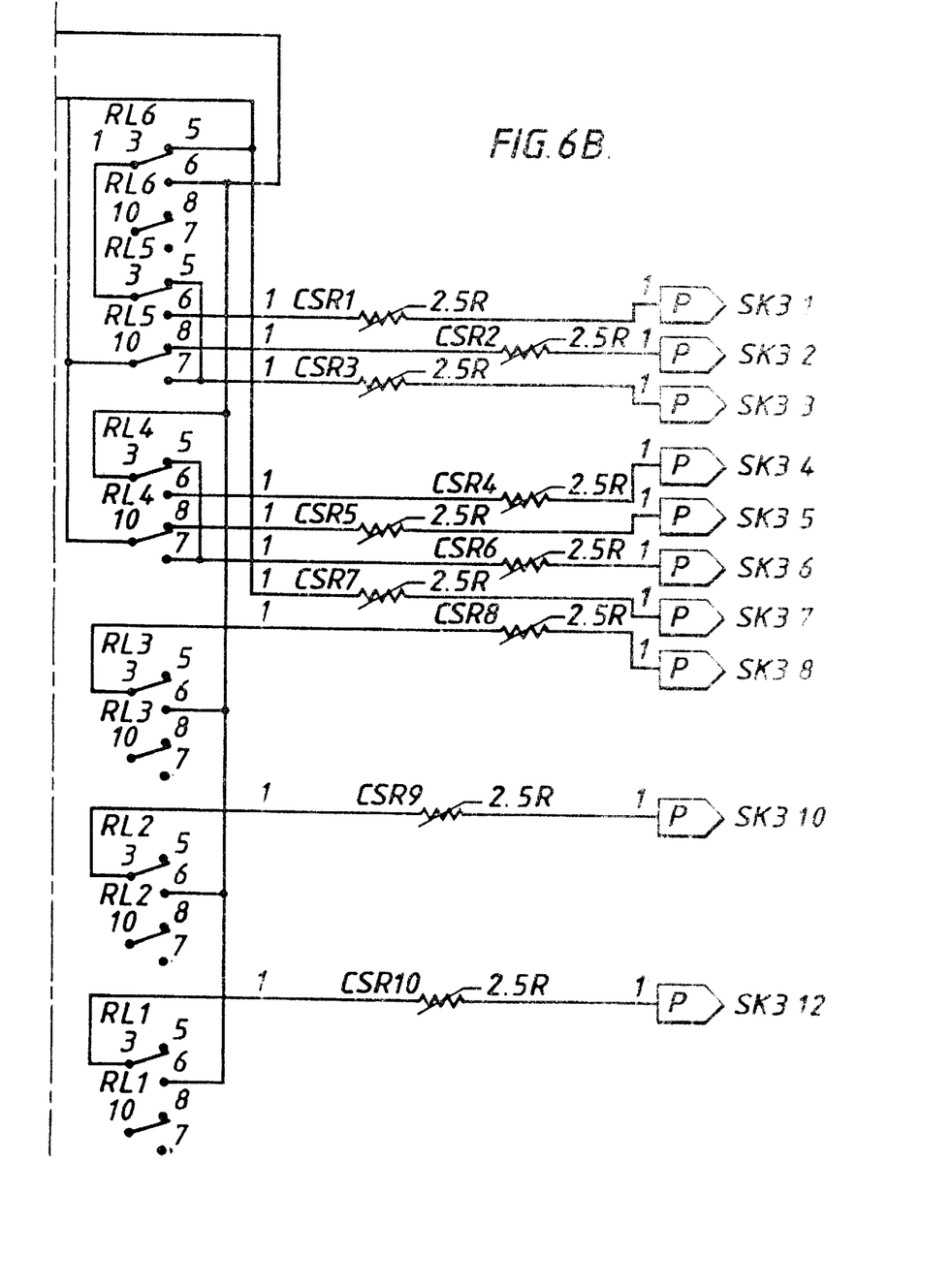

FIG. 5 also shows a relay driver printed circuit board 200 in which the board is represented diagrammatically and FIG. 6 shows the board and associated circuitry in more detail. The relay driver printed circuit board is located in the interface unit 14. The relay driver board energises enoid valves 76,80 and 90 and the actuators of the valves 82 and 86. The relay board includes inrush current suppressors at 202 in each of the ten leads SK1 to SK8 and SK10 and SK12. In the "off" condition shown in FIG. 5 the pins PL1 37, PL1 39, PL1 41, PL1 43, PL1 45 and PL1 47 are all de-energised and the voltages are shown at the leads SK1–SK8 and SK10 and SK12.

The plug PL1 shown in FIG. 5 is connected to an interface between the PC 16 and the remainder of the system. Inputs from the transducers are also connected to the interface, which also has input/output connections to the PC16.

PL1 37 controls the relay RL6 and power to RL5 (FIG. 6). PL1 39 controls RL5 and in turn switches power on/off SK3 1, 2 and 3. PL1 41 controls RL4 and in turn switches power on/off SK3 4, 5 and 6. PL1 43 controls RL3 and in turn switches power on/off SK3 8. PL1 45 controls RL2 and in turn switches power on/off SK3 10. PL1 47 controls RL1 and in turn switches power on/off SK3 12.

FIG. 6 shows the inrush current suppressors (numbered 202 in FIG. 5) CSR1–CSR10. The chip shown at 1C1 is a driver chip and provides the current to drive the relays and inverts the voltage from its input to its output. In other words, 5 volts at the input gives 0 volts at the output.

It should be remembered that actuation of the needle valve 82 can either close the valve, fully open the valve or set the needle to some intermediate position depending upon the requirement of the software and the particular test being carried out. Also, the position of the needle is monitored by the position transducer (not shown) incorporated in the actuator 110 and the resulting electrical signal is used by the computer, together with a signal from the pressure transducer 44 or from the transducer 102, in order to calculate the correct setting of the needle.

In this embodiment, the diagnostic system is designed to perform sixteen tests on the skid unit 10. The tests are:

1. Leakage Test: Equipment Test Lines
2. Wafercheck Valve: Reverse Flow Test
3. Relief Valve Performance
4. Slamshut Valve Repeatability
5. Leakage Test: Slamshut Let-by
6. Leakage Test: Slamshut Stem Seal
7. Active Regulator Static Performance
8. Slamshut Response
9. Relief Valve Repeatability
10. Leakage Test: Slamshut Diaphragm Chamber
11. "J" Governor/Relief Set-point Check
12. Leakage Test: Active Regulator Diaphragm Chamber
13. K-Pilot Set-point Check
14. Snowflake K-Pilot Set Point Check
15. Leakage Test: Stream Isolation Valves
16. Leakage Test: Pressure Soundness By way of example, the operation of the valves shown in FIG. 5 will now be described in order to carry out Test No 2 and Test No 7.

Test No 2 Wafercheck Valve: Reverse Flow Test

The needle valve actuator 110 is controlled to open the needle valve 82 by 50%. The feed solenoid valve 76 is opened. When 35 millibar pressure is reached (as monitored by the pressure transducer 44) the ball valve actuator 112 is controlled to open the ball valve 86. Flowrate is then monitored (by the transducer 102) passing (in reverse) through the stream wafercheck valve 158 from the right-hand side of the valve to the left-hand side.

After 10 seconds, the ball valve 86 is closed but solenoid valve 76 remains open to check the partial open pressure of the relief valve 157. At 30 seconds the solenoid valve 76 is closed and the re-seat pressure of the relief valve 157 is recorded.

At 50 seconds the fast vent solenoid valve 90 is opened and the test terminates.

The monitored results are displayed on the screen of the computer 16.

Test No 7 Active Regulator Static Performance

The slow vent solenoid valve 80 is opened to release the stream pressure to a pre-determined level (monitored by the transducer 44) until the regulator valve 156 starts to move. The needle valve actuator 110 is controlled to set the needle of the needle valve 82 to adjust the rate of venting and hence the rate of movement of the regulator valve 156.

When the regulator valve 156 is fully open, the slow vent solenoid 80 is closed. The feed solenoid valve 76 is opened to close off the regulator valve, with the rate of closure movement determined by computer control of actuator 110 and the needle, valve 82. The feed solenoid 76 is then closed to terminate the test.

The monitored results are displayed on the screen of the computer 16.

Figure 7:
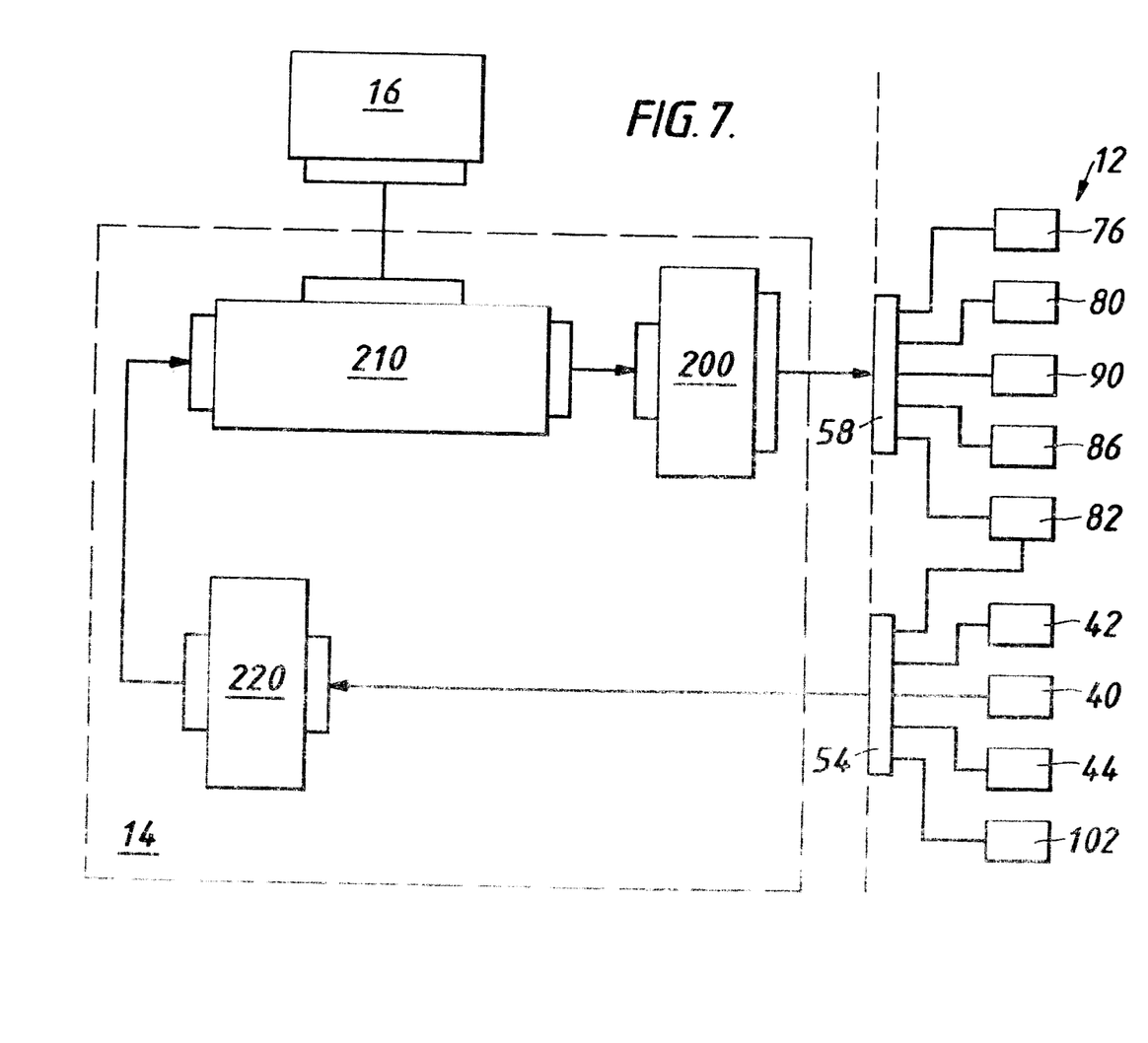
FIG. 7 is a block diagram showing the electrical connections between the valves and transducers on the one hand and the interface and computer on the other hand.

FIG. 7 shows the electrical connections between the valves and transducers described above the one hand and the interface 14 on the PC 16 on the other hand.

The PC 16 runs the test and diagnostic software for either the skid unit (as shown) or for the control module. By switching outputs on its parallel port it can perform the diagnostic tests described above and by reading inputs on its parallel port it can gain information on how the skid unit has performed during the tests.

The data acquisition system 210 interfaces the computer 16 and the remainder of the system and includes analog to digital convertors. It uses the parallel port of the computer 16 and from this is able to drive outputs and also provide inputs that the computer can read.

The relay driver board 200 takes the digital outputs from the data acquisition system 210 driven by the computer and uses them to energise the solenoid valves 76, 80 and 90 or the needle valve 82 or the ball valve 86. Basically, it takes low power digital signals and with appropriate buffering/drivers provides high power output signals for the solenoid valves and the actuators of the ball and needle valves, using relays.

The isolators 220 provide electrical isolation between the unit 12 and the inputs to the data acquisition system 210. This is an intrinsically safe system and should a fault occur in the PC 16 or the interface 14 there will be no danger of an explosion or ignition of gas at the unit 12 which is in a hazardous area.

The display 17 of FIG. 1 provides a graphical display of test results for the various pr equipment tests to aid diagnosis. Tabular results on the display may also be provided. Taking for example tests on the slamshut valve it is possible for the system to check:

(a) Slamshut response with regard to trip level and any evidence of stiction.

(b) Slamshut trip point under a fast pressure rise and evidence of any leakage past the actuator diaphragm and seals.

Figure 8:
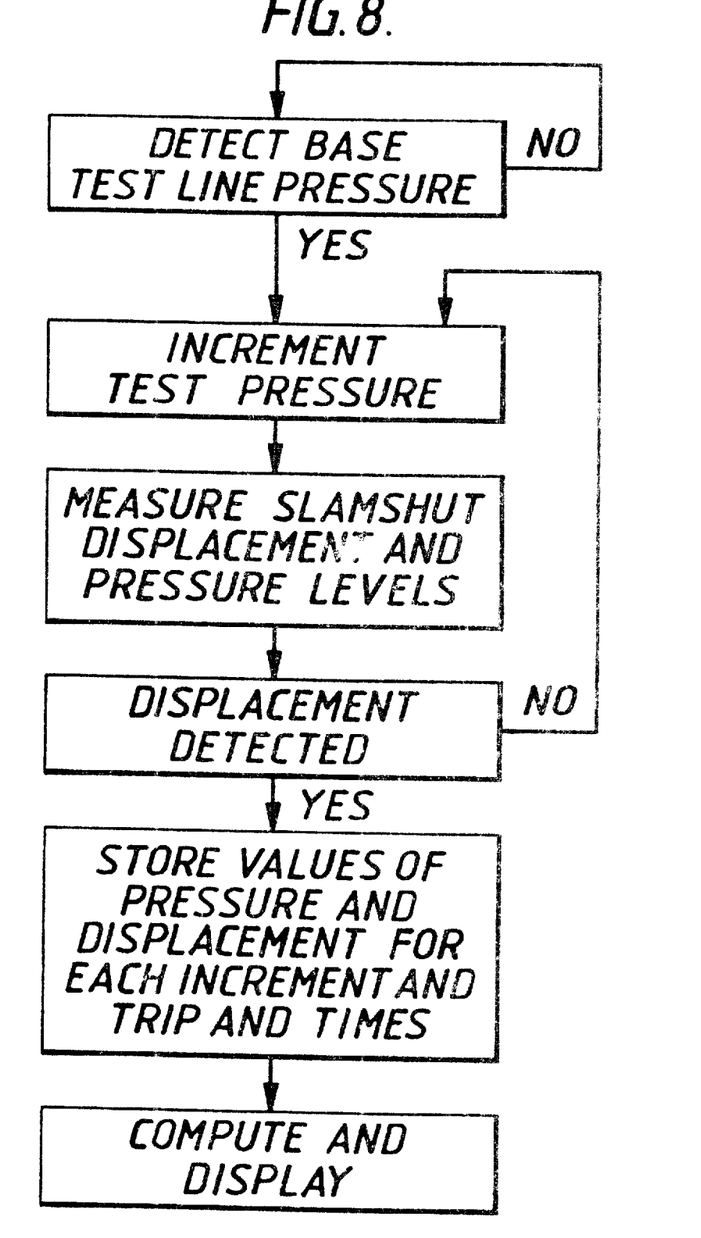
FIG. 8 is a flowchart for slamshut testing.
Figure 9:
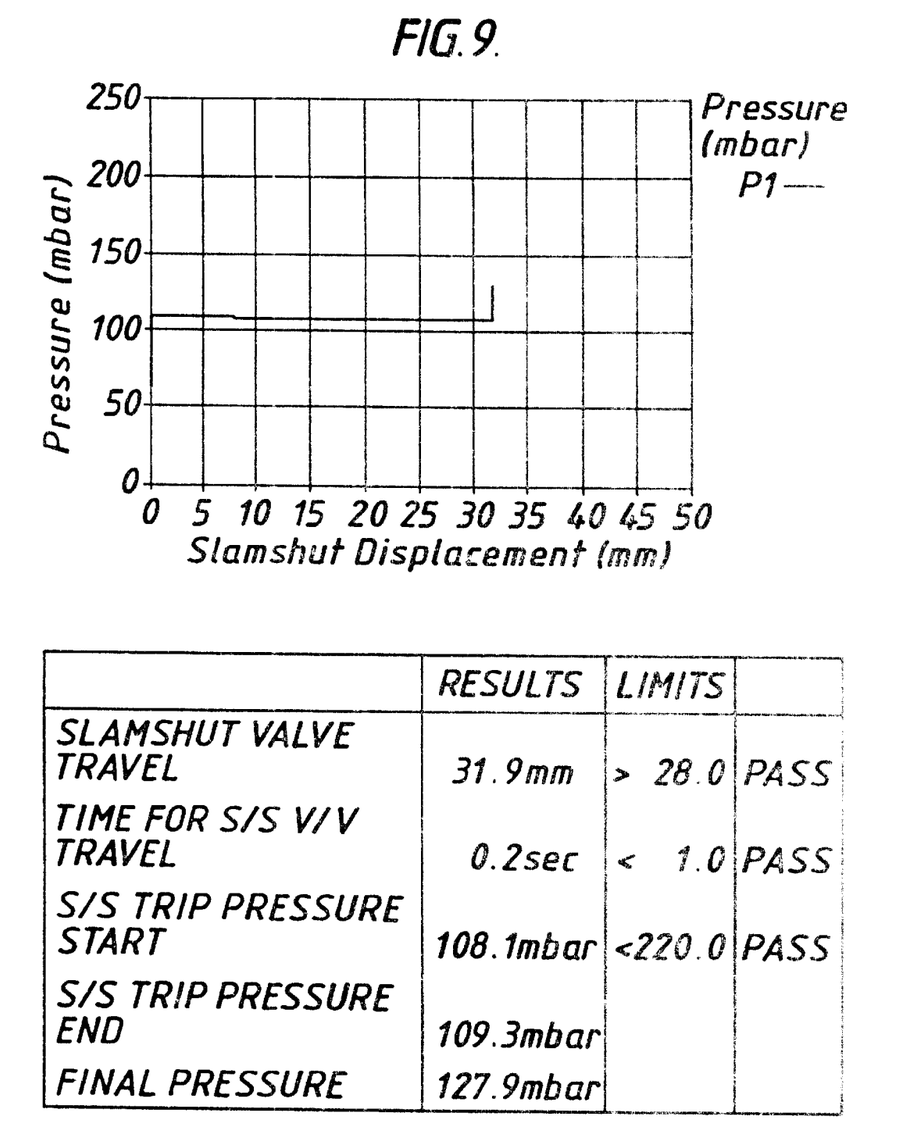
FIG. 9 is a displayed test result.

In order to carry out check (a) the computer flowchart operates as shown in FIG. 8. Here the test will automatically increment the pressure under computer control and detect and measure changes as pressure rises to detect operation. Results measured and stored can be compared with set parameters and a graph and table of results produced for display as shown in FIG. 9.

The automatic sequence can follow 'prompts' shown on the display to assist the operation, such as shown below:

1 Check slamshut is set.

2 Connect test line to the pressure transducer.

3 Connect test line to the slam shut test point.

4 Check slam shut test valve is set to 'Test'.

Figure 10:
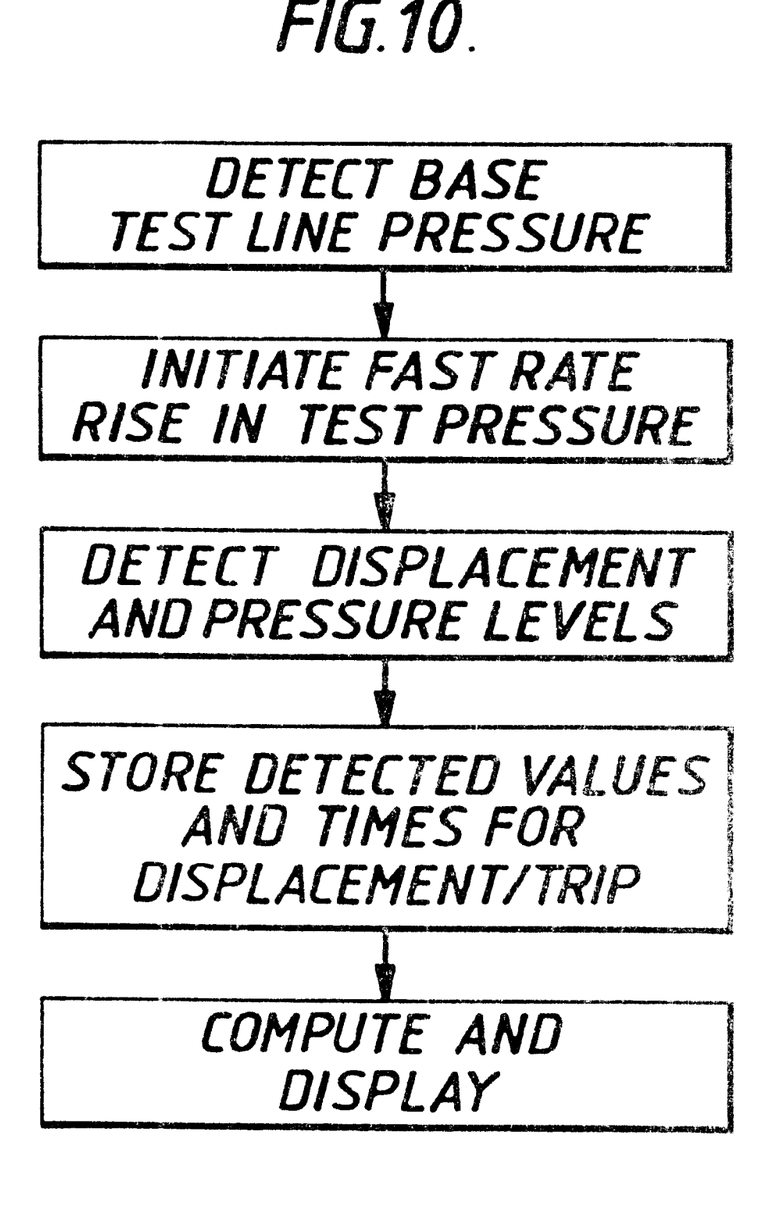
FIG. 10 is a flowchart for another slamshut test.
Figure 11:
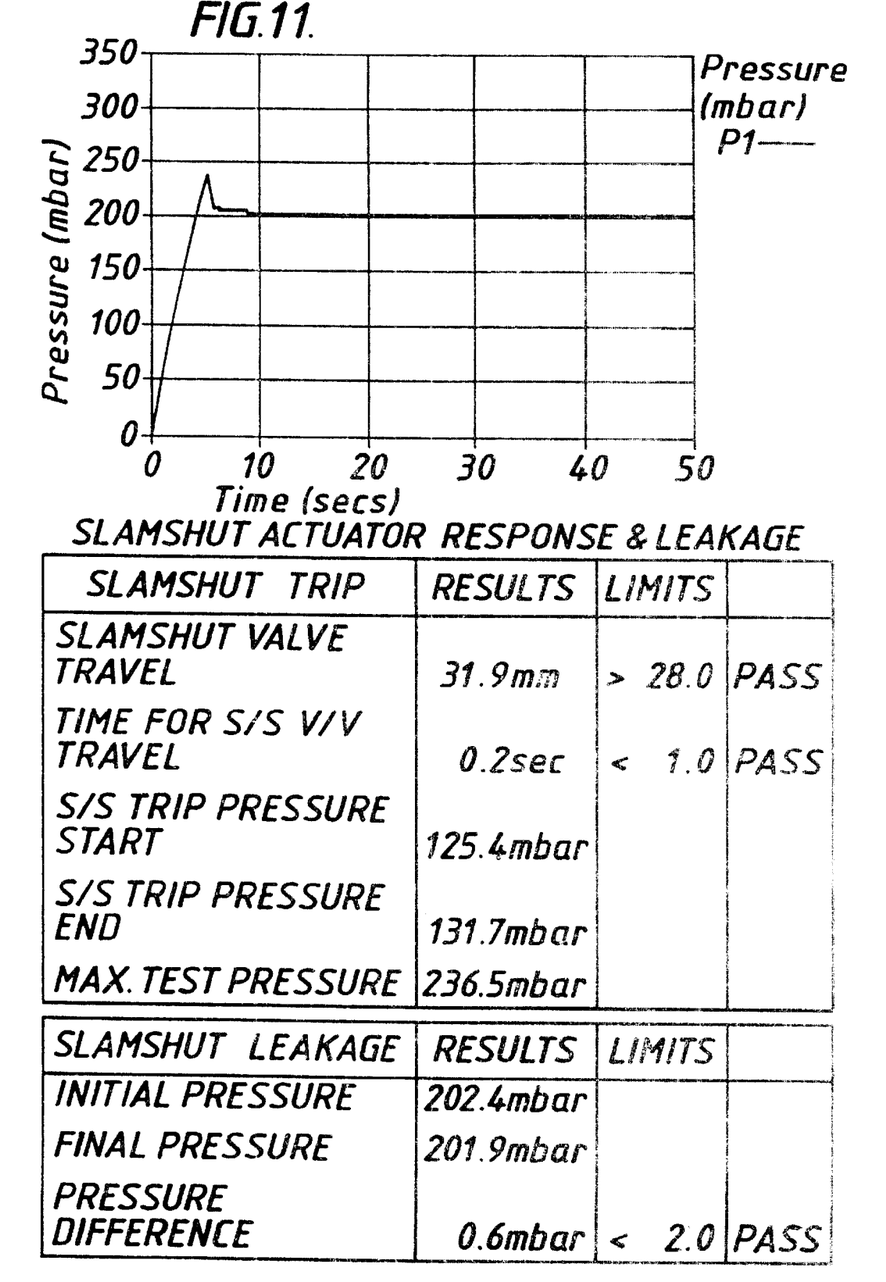
FIG. 11 is a displayed result.

To carry out the check (b) the computer flowchart in software form will operate as in FIG. 10. The displayed results are shown in FIG. 11.

Similar sequence of combined test steps will allow testing of all valves. Repeat tests will allow information on repeatability results to be stored for diagnostic purposes.

The description given above with reference to the drawings concerns apparatus to test gas pressure reducing equipment in the form of a skid unit. However, it will be appreciated that apparatus according to the invention can be used to test other gas pressure reducing equipment in the form of a gas control module for example.

What is claimed is:

1. A portable diagnostic system for testing pressure reduction equipment in situ, said system comprising:

(a) first and second displacement transducers connected to an automatic pressure regulation valve and a slamshut valve, respectively; said automatic pressure regulation valve being connected in series with said slamshut valve in a fluid stream within said pressure reduction equipment;

(b) pressure sensor means for sensing fluid pressure in said fluid stream in response to pressure reduction by said automatic pressure regulation valve;

(c) control means for selecting an output fluid pressure in said fluid stream for testing said pressure reduction equipment; and (d) means for receiving valve displacement information from said first and second transducers in dependence on selected and/or detected pressure for determining the degree of movement of said pressure regulation valve or said slamshut valve relative to the detected pressure.

2. A system as claimed in claim 1 wherein the control means includes means for comparing measured information with desired actuation criteria to provide diagnostic information.

3. A system as claimed in claim 1 wherein the control means include a computer with display means driven thereby to provide visual information on test results.

4. A system as claimed in claim 3 wherein the display means is configured to provide graphical and other details indicative of potentially faulty conditions even when the device tested is functionally correct.

5. A system as claimed in claim 1 wherein an electro-pneumatic device comprising a plurality of valves operable by the control means is provided to allow pressure and flow rates to be controlled.

6. A system as claimed in claim 1 including flow rate measurement means for use with pressure testing.

7. A system as claimed in claim 1 wherein storage means are provided to allow subsequent testing to be compared with previous test results to assist in predicting failure.

8. Apparatus having a gas inlet and a gas port for use in testing gas pressure reduction equipment the apparatus comprising:

first, second and third valves, the first and second valve having a respective inlet and outlet, the third valve having first and second valve ports, the inlet of the first valve communicating with said gas inlet, the outlet of the first valve communicating with both the inlet of the second valve and the first valve port of the third valve, the outlet of the second valve communicating with the atmosphere, the second valve port of the third valve communicating with said gas port, the third valve having a valve member and means for moving the valve member to a fully closed position and to a fully open position and to intermediate positions therebetween.

9. Apparatus according to claim 8, said third valve being associated with a position transducer which can produce an electrical output indicative of the position of said third valve member.

10. Apparatus according to claim 8 having a fourth valve having an inlet and an outlet, the inlet of the fourth valve communicating with the gas inlet and the outlet of the fourth valve communicating with said gas port.

11. Apparatus according to claim 8 having a fifth valve having an inlet and an outlet, the inlet of the fifth valve communicating with said gas port and the outlet of the fifth valve communicating with the atmosphere.

12. Apparatus according to claim 8 all of the valves having valve members and each valve having means operable electrically for moving the valve member of the valve.

13. Apparatus according to claim 12, said first, second and fifth valves being solenoid valves, said third valve being a needle valve having a valve member movable by an actuator comprising an electric motor and said fourth valve being a ball valve having a valve member movable by an actuator comprising an electric motor.

14. Apparatus according to claim 8, including means for measuring gas flowrate and means for measuring gas pressure, said means including transducers capable of producing electrical output signals.

15. Apparatus according to claim 14 in combination with gas pressure reduction equipment in the form of a gas pressure regulator operable by a diaphragm, said apparatus comprising a computer and a computer interface, and a supply of electrical energy connected to the computer, said gas inlet and said gas port being connected to tappings on said regulator or on the associated mains pipework by pressure hoses, a pressure transducer capable of producing an electrical output signal being connected to a manifold connected to a tapping on said regulator, said manifold having a plurality of ports respectively connected to a plurality of tappings on the regulator including the underside of the diaphragm of the regulator, displacement transducers capable of producing electrical output signals fitted to the regulator, including one responsive to displacement of the diaphragm of the regulator, all of said transducers being connected to said computer interface by cable and said interface being connected by cable to said means of moving each said valve member.

16. A method of testing gas pressure reduction equipment using apparatus according to claim 8 comprising comparing the results obtained with results obtained on a previous occasion of carrying out the method in order to identify changes in performance of the equipment.

17. A method of testing gas pressure reduction equipment using apparatus according to claim 15 comprising interrogation of said computer to identify which component of the equipment may be at fault when the results show that a predetermined standard is not met.

18. A method of testing gas pressure reduction equipment using apparatus according to claim 15 comprising downloading and storing test results on a computing system in order to generate maintenance records.

19. A method of testing gas pressure reduction equipment using apparatus according to claim 15 comprising controlling by means of software used in said computer the rate of pressure rise and the rate of pressure fall in the gas applied to a component of the equipment.

20. A method of testing gas pressure reduction equipment using apparatus according to claim 15 comprising the following steps conducted to test a non-return valve of the equipment using reverse flow:

(a) opening the third valve (needle valve) by 50%;

(b) opening the first solenoid valve;

(c) when a preset pressure is reached opening the fourth valve (ball valve);

(d) recording flowrate passing through the non-return valve;

(e) after a pre-set first period closing the fourth valve (but keeping the first valve open to check partial open pressure of a relief valve of the equipment);

(f) after a second pre-set period close the first valve;

(g) record the pressure (the relief valve re-seat pressure); and (h) after a third pre-set period open the second solenoid valve.

21. A method of testing gas pressure reduction equipment using apparatus according to claim 8 comprising the following steps conducted to test a gas pressure regulator of the equipment:

(a) reduce the gas pressure in the equipment by opening the second valve until a predetermined pressure is reached;

(b) adjust the setting of the third valve (needle valve) until the regulator valve member starts to move at a controlled rate;

(c) when the regulator valve is fully open, close the second valve;

(d) open the first valve;

(e) repeat step (b);

(f) when the regulator vale is fully closed, close the first valve.

* * * * *